United States Patent
Jang et al.

(10) Patent No.: US 8,538,116 B2
(45) Date of Patent: Sep. 17, 2013

(54) METHOD AND APPARATUS FOR RECONSTRUCTING IMAGE AND MEDICAL IMAGE SYSTEM EMPLOYING THE METHOD

(75) Inventors: Kwang Eun Jang, Busan (KR); Young Hun Sung, Hwaseong-si (KR); Jong Ha Lee, Hwaseong-si (KR); Seok Min Han, Seongnam-si (KR); Dong-Goo Kang, Suwon-si (KR); Kang Eui Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 13/223,707

(22) Filed: Sep. 1, 2011

(65) Prior Publication Data

US 2012/0057770 A1 Mar. 8, 2012

(30) Foreign Application Priority Data

Sep. 7, 2010 (KR) .......................... 10-2010-0087502

(51) Int. Cl.
*G06K 9/00* (2006.01)

(52) U.S. Cl.
USPC ........................................... 382/131; 382/132

(58) Field of Classification Search
None
See application file for complete search history.

(56) References Cited

U.S. PATENT DOCUMENTS

| 2008/0279433 A1* | 11/2008 | Brau et al. ................. 382/131 |
| 2010/0054394 A1* | 3/2010 | Thibault et al. ................ 378/8 |

FOREIGN PATENT DOCUMENTS

| JP | 11-259650 | 9/1999 |
| KR | 10-2009-0018037 | 2/2009 |
| KR | 10-2010-0040652 | 4/2010 |

OTHER PUBLICATIONS

Alexander H. Delaney and Yoram Bresler, "Multiresolution Tomographic Reconstruction Using Wavelets", Jun. 1995, IEEE Transaction on Image Processing, vol. 4, No. 6, pp. 799-813.*

* cited by examiner

*Primary Examiner* — Samir Ahmed
*Assistant Examiner* — Siamak Harandi
(74) *Attorney, Agent, or Firm* — NSIP Law (57) ABSTRACT

A method and apparatus for reconstructing an image and a medical image system are provided. An image reconstruction processing method may include acquiring an initial value with respect to a tomographic image of an object to be inspected, initializing an auxiliary variable, acquiring one or both of a weighted value and an error value, based on a measured value, transforming a measured image signal, updating the auxiliary variable using a transform coefficient used to transform the measured image signal, and updating the measured value using the updated auxiliary variable, and one or both of the acquired weighted value and the error value.

8 Claims, 6 Drawing Sheets

METHOD AND APPARATUS FOR RECONSTRUCTING IMAGE AND MEDICAL IMAGE SYSTEM EMPLOYING THE METHOD

CROSS-REFERENCE TO RELATED APPLICATION

This application claims the benefit of Korean Patent Application No. 10-2010-0087502, filed on Sep. 7, 2010, in the Korean Intellectual Property Office, the entire disclosure of which is incorporated herein by reference for all purposes.

BACKGROUND

1. Field

The following description relates to an image reconstruction method and apparatus, and a medical image system employing the image reconstruction method and apparatus.

2. Description of the Related Art

X-ray mammography is widely used to process an image of an internal organ, for example, to process an image of breast tissues. For example, a Full Field Digital Mammography (FFDM) is believed by some as a cost effective approach to detect a microcalcification tissue with an extremely small size. In X-ray mammography, however, performance may be degraded when detecting a mass that is one of main lesions. In the case of breast examination, a radiation image for a breast may be obtained by compressing tissues in the breast, and by performing two-dimensional (2D) projection. Here, however, when a density is high, it may be difficult to perform an accurate diagnosis, since a large number of tissues appear to overlap each other.

A Digital Breast Tomosynthesis (DBT) scheme may be used to capture an object to be inspected, for example, a breast, from 7 to 30 different angles, in a different manner from the X-ray mammography. Thus, the DBT scheme may improve the overlapping of tissues issue.

A Computerized Tomography (CT) scheme may enable a three-dimensional (3D) reconstruction, since projection data for an angle greater than 180° is obtained. Here, a Filtered Back-Projection (FBP) may be used as a reconstruction algorithm, and simple filtering is performed in the Fourier domain and a back projection for combination in an image domain is performed.

In a tomographic image, that is, an image acquired under a tomosynthesis scheme, information may be lost as images are acquired in a limited angle range.

A large number of X-ray systems display an image using a detected attenuation characteristic by passing an X-ray with a single energy band through an object to be inspected. When materials of the object have different attenuation characteristics, an image in high quality may be obtained. However, when the materials of the object have similar attenuation characteristics, the quality of the image may be deteriorated.

A multi-energy X-ray based system may acquire an X-ray image with at least two energy bands. Generally, since materials exhibit different X-ray attenuation characteristics in different energy bands, images may be discriminated for each material based on the different X-ray attenuation characteristics.

Currently, with regards to CT schemes or nondestructive inspection devices, products equipped with a dual energy source or a dual energy separation detector are being launched. The products may acquire an image by rotating a source by at least 180° on an object to be inspected and accordingly, it is possible to obtain density images of materials forming the object. A dual energy CT equipment may be used to obtain an image with a constant quality in a relatively simple manner, for example, by masking Pseudo-color by adding, subtracting, or segmenting an acquired image.

In 3D reconstruction, a beam hardening artifact may occur due to approximation of monochromatic radiation. An inner portion of an object to be inspected may appear abnormally dark due to the beam hardening artifact. In other words, reconstruction is performed by more considerable attenuations in an outer portion of the object, and thus the dark inner portion of the object may be interpreted as a phenomenon due to approximation of monochromatic radiation.

As described above, a system associated with a multi-energy X-ray using at least two different energy spectrums has been proposed. In reconstruction using the system, approximation of monochromatic radiation may be used.

SUMMARY

In one general aspect, there is provided a system associated with a multi-energy X-ray using at least two different energy spectrums, in which approximation of monochromatic radiation is not used, to improve the accuracy of reconstruction.

In another aspect, there is provided a system associated with a multi-energy X-ray, in which a polychromatic radiation model is applied in a quantitative material discrimination.

In still another aspect, there is provided an image reconstruction processing method, the method including acquiring an initial value with respect to a tomographic image of an object to be inspected, initializing an auxiliary variable, acquiring one or both of a weighted value and an error value, based on a measured value, transforming a measured image signal, updating the initialized auxiliary variable using a transform coefficient used to transform the measured image signal, and updating the measured value using the updated auxiliary variable, and one or both of the acquired weighted value and the error value.

The acquiring of one or both of the weighted value and the error value may include computing one or both of the weighted value and the error value based on a secondary Taylor series approximation of a Kullback-Leibler (KL) divergence function corresponding to a Poisson log-likelihood function.

The acquiring of one or both of the weighted value and the error value may include computing one or both of the weighted value and the error value, using one or more of a maximum likelihood-expectation maximization (ML-EM) algorithm based on a monochromatic radiation model, an ML-convex algorithm, and a simultaneous algebraic reconstruction technique (SART) algorithm.

The transforming of the measured image signal may include transforming the measured image signal to enable a multi-resolution analysis.

The transforming of the measured image signal to enable the multi-resolution analysis may include transforming the measured image signal using one or more of a wavelet transform, a contourlet transform, a curvelet transform, a shearlet transform, a bandelet transform, and a ridgelet transform.

The updating of the auxiliary variable may include multiplying a transform coefficient of the measured value by a first weighted value for each portion, performing a gradient operation on the transform coefficient multiplied by the first weighted value, and multiplying the transform coefficient where the gradient operation is performed, by a second weighted value, and adding the auxiliary variable thereto.

The updating of the measured value may include performing a divergence operation on the updated auxiliary variable, multiplying the auxiliary variable where the divergence operation is performed by a first weighted value for each portion, transforming the auxiliary variable multiplied by the first weighted value into an image signal, and multiplying a value obtained by subtracting a value resulting from the transforming of the auxiliary variable from the acquired error value, by a second weighted value, and adding the measured value thereto.

The method may further include repeating the acquiring of one or more of the weighted value and the error value, the transforming of the measured image signal, the updating of the initialized auxiliary variable, and the of updating the measured value.

In still another aspect, there is provided a material discrimination image generator, the image generator including an initial image estimator configured to receive a projection image for each energy band generated by passing a multi-energy X-ray spectrum through an object to be inspected having at least one material, and to generate an initial image for each of the at least one material, and an image updating unit configured to update the initial image to a material discrimination image, using attenuation information corresponding to the at least one material and spectrum information for the multi-energy X-ray.

The initial image estimator may estimate the initial image using energy distribution information for each of the at least one material.

The image updating unit may update the initial image further using a hyperparameter associated with the at least one material.

The image updating unit may update the initial image to which a correction value is applied, for a predetermined number of times, by providing the initial image as a feedback.

The image updating unit may acquire a correction value for minimizing a predetermined cost function, apply the correction value to the initial image, and update the initial image to the material discrimination image.

In still another aspect, there is provided a material discrimination image generator, the image generator including a receiver configured to receive a projection image for each energy band generated by passing an X-ray spectrum through an object to be inspected having at least one material, an initial image estimator configured to acquire an initial image for the at least one material based on the projection image, and an acquiring unit configured to acquire a material discrimination image for the at least one material by applying an image updating algorithm to the initial image.

In still another aspect, there is provided a medial image system, the medical image system including a source configured to irradiate a multi-energy X-ray spectrum to an object to be inspected having at least one material, a material discrimination image processor configured to acquire a material discrimination image for each of the at least one material, and a final reconstruction image generator configured to generate a final reconstruction image by applying a reconstruction algorithm to a tomographic image including the acquired material discrimination image.

The material discrimination image processor may receive a projection image of each energy band generated by passing the X-ray spectrum through the object to be inspected having the at least one material, and acquire the material discrimination image for each of the at least one material.

The material discrimination image processor may include a receiver configured to receive a projection image for each energy band, an initial image estimator configured to acquire an initial image for each of the at least one material, and an acquiring unit configured to acquire the material discrimination image for each of the at least one material by applying an image updating algorithm to the initial image.

The initial image estimator may acquire the initial image based on energy distribution information for the at least one material.

In still another aspect, there is provided a medial image system including a source configured to irradiate a multi-energy X-ray spectrum, and a material discrimination image processor configured to receive projection images for each energy band generated by passing the multi-energy X-ray spectrum through an object to be inspected formed of at least one material, and to acquire a material discrimination image for each of the at least one material.

In still another aspect, there is provided a medial image system including a source configured to irradiate an X-ray spectrum, an X-ray detector configured to classify at least two energy bands, and a material discrimination image processor configured to receive projection images for each of the detected at least two energy bands and to acquire material discrimination images for at least two materials.

In still another aspect, there is provided a medial image system including at least one source configured to irradiate an X-ray spectrum in at least two positions, an X-ray detector configured to classify at least two energy bands, and a material discrimination image processor configured to receive projection images in the at least two positions and to acquire a single three-dimensional (3D) material discrimination image or at least two 3D material discrimination images.

In still another aspect, there is provided an image reconstruction processing method including acquiring an initial value with respect to a tomographic image of an object to be inspected, initializing an auxiliary variable, acquiring a weighted value and an error value, based on a measured value, transforming a measured image signal, updating the initialized auxiliary variable using a transform coefficient used to transform the measured image signal, updating the measured value using the updated auxiliary variable, the acquired weighted value, and the acquired error value.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

According to an aspect, provided are an image reconstruction processing method and a medical image system employing the image reconstruction processing method, in which a tomographic image of an object to be inspected is reconstructed to a final image, using a two-dimensional (2D) projection image of the object that is acquired through an X-ray.

According to another aspect, provided are an image reconstruction processing method and a medical image system employing the image reconstruction processing method, in which a tomographic image of an object to be inspected that includes a material discrimination image, is reconstructed to a final image, using a 2D projection image of the object that is acquired through a multi-energy X-ray.

According to still another aspect, provided are an image reconstruction processing method and a medical image system employing the image reconstruction processing method, in which material discrimination of an object to be inspected is performed using a 2D projection image of the object that is acquired through a multi-energy X-ray.

An image reconstruction processing apparatus and a medical image system according to example embodiments, may refer to a system using a single X-ray source or at least two X-ray sources in a single position or in at least two different positions, and/or using a source for fast switching a voltage, and/or using a source where an anode formed of at least two materials is used, and/or using a source including a filter that is formed of at least two materials and that is located in a front portion thereof, and/or using an X-ray detector for detecting at least two energy bands for each of the at least two energy bands. The image reconstruction processing apparatus and the medical image system may be implemented, for example, as a radiography system, a tomosynthesis system, a Computed Tomography (CT) system, and a non-destructive inspection device. The implementations described are merely examples, and accordingly, it is understood that other implementations are possible and a multi-energy X-ray based system based on teachings herein may be utilized in various applications.

As illustrative examples, provided are an image reconstruction processing method for reconstructing a tomographic image of an object to be inspected to a final image, by using a two-dimensional (2D) projection image of the object that is acquired through an X-ray, an image reconstruction processing method for reconstructing a tomographic image of an object to be inspected including a material discrimination image to a final image, by using a 2D projection image of the object that is acquired through a multi-energy X-ray, an image reconstruction processing method for performing material discrimination of an object to be inspected, by using a 2D projection image of the object that is acquired through a multi-energy X-ray.

The above described field may be illustrated by the following Equation 1.

$$\operatorname*{argmin}_{x} x^T W^T W x - 2x^T W^T b_0 \qquad \text{[Equation 1]}$$

In Equation 1, x denotes a target to be reconstructed using a vector, and W and b respectively denote a matrix and a vector that are determined based on a predetermined reconstruction scheme. To perform more stable and accurate reconstruction under a condition of insufficient data and relatively high noise, neighboring pixel information regarding neighboring pixels may be used. A Total Variation (TV) regularization scheme may preserve edge information while using the neighboring pixel information. Equation 2 may be obtained by using the TV regularization scheme with respect to Equation 1, as follows.

$$\operatorname*{argmin}_{x} x^T W^T W x - 2x^T W^T b_0 + 2\lambda \|x^I\|_{TV} \qquad \text{[Equation 2]}$$

In Equation 2, $x^I$ denotes an image to be reconstructed, using a matrix. Equation 2 may be obtained by adding a TV norm to Equation 1. The following Equation 3 or Equation 4 may be selectively used for a TV norm in a 2D problem.

$$x^I \in R^{m \times n}, \qquad \text{[Equation 3]}$$

$$\|x^I\|_{TV_l} = \sum_{i=1}^{m-1} \sum_{j=1}^{n-1} \sqrt{(x_{i,j} - x_{i+1,j})^2 + (x_{i,j} - x_{i,j+1})^2} +$$

$$\sum_{i=1}^{m-1} |x_{i,n} - x_{i+1,n}| + \sum_{j=1}^{n-1} |x_{m,j} - x_{m,j+1}|$$

$$x^I \in R^{m \times n}, \|x^I\|_{TV_{L_1}} = \sum_{i=1}^{m-1} \sum_{j=1}^{n-1} \{|x_{i,j} - x_{i+1,j}| + |x_{i,j} - x_{i,j+1}|\} + \qquad \text{[Equation 4]}$$

$$\sum_{i=1}^{m-1} |x_{i,n} - x_{i+1,n}| + \sum_{j=1}^{n-1} |x_{m,j} - x_{m,j+1}|$$

Equation 2 may be further generalized. For example, a coefficient of a predetermined transform, such as a wavelet transform, instead of an image value x in Equation 2 may be substituted with an unknown number. Here, a problem may be expressed as given in Equation 5.

$$\operatorname*{argmin}_{\theta} \left( \theta^T \Phi * W^T W \Phi \theta - 2\theta^T \Phi * W^T b_0 + 2 \sum_i \lambda_i \|\theta_i^I\|_{TV} \right) \qquad \text{[Equation 5]}$$

In Equation 5, $\Phi$ denotes a predetermined transform, and $\Phi^*$ denotes a Hermitian operation of the transform $\Phi$. Additionally, $\theta$ denotes a coefficient of the transform $\Phi$ using a vector, and $\theta_i$ is a portion of $\theta$. For example, when $\Phi$ denotes a wavelet reverse transform, $\theta_i$ may denote an i-th sub-band. A feature of Equation 5 is that a regularization coefficient $\lambda$ with different intensities for each portion of $\theta$ is used. In addition, Equation 5 may be obtained by generalizing Equation 2. In an example in which $\Phi=I$, Equation 5 may be equivalent to Equation 2.

To simplify Equation 5, Equation 6 may be introduced as below.

$$A = W\Phi \qquad \text{[Equation 6]}$$

In Equation 6, A denotes an operator obtained by combining an operation W of Equation 2 with the predetermined transform $\Phi$ of Equation 5. Equation 7 may be obtained by rewriting Equation 5 using Equation 6, as below.

$$\operatorname*{argmin}_{\theta}\left(\theta^T A * A\theta - 2\theta^T A * b_0 + 2\sum_i \lambda_i \|\theta_i^l\|_{TV}\right) \quad \text{[Equation 7]}$$

Problems such as Equations 2, 5, and 7 may be regarded as TV minimization problems. When the TV minimization problems are solved or improved, edge information may be better preserved while the neighboring pixel information is used. However, in a tomography reconstruction problem, it is difficult to restrict noise using a known TV minimization scheme, due to a large amount of data. However, since a gradient exists in a dual problem of the TV minimization problem, a gradient-based TV minimization scheme may be applied.

In the dual problem of the TV minimization problem, a dual variable for describing a desired x continues to be updated, to finally obtain x. In examples and embodiments illustrated herein, a description may be provided based on 2D. However, it is understood that teachings provided herein may extended to embodiments with other than 2D, for example, to 3D.

It is assumed that P is a set of matrix pairs (p, q) satisfying the following condition. (p,q) denotes a matrix satisfying $P \in \mathbb{R}^{(m-1) \times n}$, and $q \in \mathbb{R}^{m \times (n-1)}$. In the example, values of (p, q) are to satisfy the following conditions as given in Equation 8.

$$p_{i,j}^2 + q_{i,j}^2 \leq 1, i=1, \ldots, (m-1), j=1, \ldots, (n-1) |p_{i,j}| \leq 1,$$
$$|q_{i,j}| \leq 1 \quad \text{[Equation 8]}$$

A gradient and a divergence operation of a discrete signal may be defined as given in Equation 9 below. To reconstruct a tomographic image, a gradient operation and divergence operation may be performed with respect to each material forming the tomographic image.

Divergence operation for $(p,q)$: $\mathcal{L}(p,q) \to \mathbb{R}^{m \times n}$, $$\mathcal{L}(p,q)_{i,j} = p_{i,j} - p_{i-1,j} + q_{i,j} - q_{i,j-1} \quad \text{[Equation 9]}$$

Gradient operation for x:

$$\mathcal{L}^T(x) = (p, q),$$
$$p_{i,j} = x_{i,j} - x_{i+1,j}$$
$$q_{i,j} = x_{i,j} - x_{i,j+1}$$

A dual problem of Equation 7 may be induced as given in Equation 10 below.

$$\operatorname*{argmin}_{\theta} \operatorname*{argmax}_{(p,q)} \quad \text{[Equation 10]}$$
$$\|\theta - \Phi^+(\hat{x} + (W^T W)^{-1}(b_0 - \Phi \lambda \text{vec}\{\mathcal{L}(p, q)\}))\|_2^2 -$$
$$\|b - (A^+) * \lambda \text{vec}\{\mathcal{L}(p, q)\}\|_2^2$$

In Equation 10, vec denotes a change of a value stored in a 2D matrix to a vector form. $\Phi^+$ and $A^+$ respectively denote a pseudo-inverse of $\Phi$ and operator A. In the case of a wavelet transform, $\Phi$ may denote an operator for transforming a wavelet coefficient into an image signal, and $\Phi^+$ may denote an operator for transforming an image signal into a wavelet coefficient. $A^+$ may be expressed as given in Equation 11 below.

$$A^+ = \Phi^+ W^{-1} = (\Phi^* \Phi)^{-1} \Phi^* W^{-1} \quad \text{[Equation 11]}$$

An algorithm to solve Equation 10 may be induced as given in Equation 12 below.

$$(p^{(k+1)}, q^{(k+1)}) = (p^{(k)}, q^{(k)}) + c \cdot \mathcal{L}^T \text{unvec}\{\lambda \hat{\theta}^{(k)}\} \hat{\theta}^{(k)}$$
$$= P_C\{\Phi^+(\hat{x}^{(k)})\} \hat{x}^{(k+1)} = \hat{x}^{(k)} + (W^T W)^{-1}(b_0 - \Phi \lambda \text{vec}\{$$
$$\mathcal{L}(p^{(k+1)}, q^{(k+1)})\})\|_2^2 \quad \text{[Equation 12]}$$

In Equation 12, $\lambda \hat{\theta}^{(k)}$ denotes a vector obtained by multiplying $\theta_i$ that is a portion of $\theta$ by $\lambda_i$. Unvec{ } signifies that an image signal stored in a vector is changed in a 2D matrix form and the changed image signal is stored. Pc{ } denotes an operation of appropriately normalizing, scaling, or thresholding a signal.

Equation 12 provides a scheme to solve Equation 5 obtained by generalizing Equation 2. To apply the scheme to a tomography field, W and $b_0$ are defined again.

In the field of tomography, a reconstruction scheme includes a maximum likelihood-expectation maximization (ML-EM) scheme, an ML-convex scheme, a simultaneous algebraic reconstruction technique (SART) scheme, an ART scheme, and the like. Such reconstruction scheme may be interpreted as an algorithm used to solve Equation 1. For example, the ML-convex scheme may enable repetitive computation of a problem where W and $b_0$ in Equation 13 are substituted into Equation 1.

$$(W^T W)_{i,j} = \frac{1}{\hat{x}_{i,j}} \sum_i l_{ij} \langle l_i, \hat{x} \rangle d_i \exp(-\langle l_i, \hat{x} \rangle) \quad \text{[Equation 13]}$$

$$b_{0i,j} = (W^T W)_{i,j} \hat{x}_{i,j} + \sum_i l_{ij}(Y_i - d_i \exp(-\langle l_i, \hat{x} \rangle))$$

In Equation 13, i denotes an index of a detector, and j denotes a voxel index of an object to be inspected for reconstruction. Additionally, $\langle l_i, x \rangle$ denotes an integration for a ray connecting an i-th detector to a source, that is, denotes, for example, a Radon transform. The $l_{ij}$ denotes a length of an i-th line passing through a j-th voxel, and $$\sum_i l_{ij}(\cdot)$$

denotes a back-projection that is a transpose operation of the Radon transform. An ML-EM algorithm, a SART algorithm, and an ART algorithm can also be interpreted with Equation 13 and obtained. When Equation 13 is substituted into the algorithm described in Equation 12, ML-EM, ML-convex, ART, and SART included in the TV regularization may be reconstructed.

Equation 13 may be obtained by performing approximation using a secondary Taylor series, in a numerical formula obtained by simplifying a Poisson log-likelihood function using approximation of a monochromatic radiation. The monochromatic radiation refers to a situation where a monochromatic X-ray is generated. A large number of known reconstruction algorithms induce W and b, under assumption of the monochromatic radiation as shown in Equation 13. Also, ML-EM and SART may be used to simplify a data acquisition model under assumption of the monochromatic radiation, despite numerical formula being different in form from each other. However, in most X-ray sources used in image diagnosis or nondestructive inspection, polychromatic radiation may occur. In other words, polychromatic X-rays may be radiated from X-ray sources. According to an embodiment, a reconstruction scheme proposed in the present disclosure enables reconstruction of a final image based on an X-ray source with a polychromatic radiation characteristic, and W and b may be computed using the data acquisition model of polychromatic radiation.

A system based on a simulated single energy or multi-energy X-ray may be expressed as given in Equation 14 below.

$$Y_j(r_s) = \int_{Ej_s} {}^{Eje}I_j(\epsilon)\exp(-\int_{r_s} \mu(x,y,z,\epsilon)dp)d\epsilon + n(r_s) \quad \text{[Equation 14]}$$

In Equation 14, Y denotes a measured image of a system based on a multi-energy X-ray measured in a j-th energy band. Additionally, I denotes a known function based on an influence of a source irradiated to an object to be inspected and a response influence of a detector, and includes spectrum information of a system based on a multi-energy X-ray. F denotes a function (x and E) based on an influence of a composition ratio of materials forming an object to be inspected in a corresponding energy band. Furthermore, j denotes an index of an energy band, and r denotes an N-dimensional position vector, for example, (x, y) in the case of a 2D image, (x, y, z) in the case of a 3D image, and the like. For example, $$F_j(x, E) = \sum_i \mu_i(E_k)L_i$$

may be obtained. E denotes an energy variable, and n denotes a noise term.

To solve Equation 14, the Poisson log-likelihood may be maximized. Since an operation of the Poisson log-likelihood is complex, it is difficult to induce a solution for maximizing the Poisson log-likelihood without using approximation of monochromatic radiation. However, complexity may be reduced if commonality between the Poisson log-likelihood and a Kullback-Leibler (KL) divergence, that are mathematically proven, is used. The KL divergence may be expressed as given in Equation 15.

$$KL(x) = \sum_{k,i,E} \left( d^{(k)}(i) \frac{\hat{q}^{(k)}(i, E)}{\sum_{E'} \hat{q}^{(k)}(i, E')} \right) + \\ \sum_{k,i,E} \left( I^{(k)}(i, E)\exp\left(-\sum_m \mu_m(E)\langle l_i, x_m\rangle\right) \right) \quad \text{[Equation 15]}$$

In Equation 15, k denotes an index indicating an energy spectrum, and may have a value greater than 1. Additionally, j denotes a voxel index of an object to be inspected for reconstruction. Furthermore, i denotes an index of a detector, and d(i) denotes a data value detected from an i-th pixel of the detector. The $\langle l_i, x\rangle$ denotes an integration for a ray connecting an i-th detector to a source, that is, denotes, for example, a Radon transform. In addition, m denotes an index of an attenuation curve $\mu_m(E)$, and may have a value greater than 1. In Equation 15, x signifies information to be reconstructed. The $x_m$ denotes a subset of x, and may be interpreted as an object to be inspected that is formed of materials corresponding to m. The I(i,E) denotes an X-ray spectrum. When an attenuation phenomenon does not occur, I(i,E) denotes a number of X-ray photons of E-energy physically reaching an i-th detector pixel, q(i,E) denotes a monochromatic model for an i-th pixel and may be defined as given in Equation 16 below.

$$\hat{q}^{(k)}(i, E) = I^{(k)}(i, E)\exp\left(-\sum_m \mu_m(E)\langle l_i, \hat{x}\rangle\right) \quad \text{[Equation 16]}$$

When an x for minimizing the KL divergence is found by approximating an x using the secondary Taylor series and by updating the approximated x, Equation 15 may become equivalent to a problem of Equation 1. Here, W and b may be calculated by the following Equation 17:

$$(W^T W)_{i,j} = \sum_k \sum_i l_{ij} \sum_E \hat{q}^{(k)}(i, E)\mu(E)\mu(E)^T \quad \text{[Equation 17]}$$

$$b_{0i,j} = (W^T W)_{i,j}\hat{x}_{i,j} + \\ \sum_k \sum_i l_{ij}\left(1 - \frac{d^{(k)}(i)}{\hat{d}^{(k)}(i)}\right)\sum_E \hat{q}^{(k)}(i, E)\mu(E)$$

In Equation 17, $$\sum_i l_{ij}(\cdot)$$

denotes a back-projection that is a transpose operation of the Radon transform.

An image processing method based on a polychromatic model may be induced by combining Equation 12 and Equation 17.

In an example in which at least two different X-ray spectrums are emitted in a single position and measured by a detector, or in another example in which a single X-ray spectrum or at least two different X-ray spectrums are emitted in a single position and measured by a detector enabling energy classification, a scheme of combining Equation 12 and Equation 17 may be used to discriminate materials. Here, since an image to be reconstructed may become 2D image, there is no need to perform $$\sum_i l_{ij}(\cdot).$$

Additionally, in the examples, a multi-energy X-ray radiography, a mammography, and the like may be used.

In still another example in which a projection image is obtained in a plurality of different positions and a single X-ray spectrum is used, an image without a beam hardening artifact may be reconstructed using a single attenuation curve (m=1).

In still another example in which a projection image is obtained in a plurality of different positions, and when a single X-ray spectrum is used, a 3D image without a beam hardening artifact may be reconstructed using a single attenuation curve (m=1), and a 3D image where materials are discriminated may be reconstructed using at least two attenuation curves (m>1). The scheme of using at least one X-ray spectrum may include, for example, a scheme of using at least two X-ray sources, and/or a scheme of fast switching a voltage applied to a source, and/or a scheme of forming an anode of a source using at least two materials, and/or a scheme of forming a filter using at least two materials and locating the filter in a front end of a source, and the like.

Through the above schemes, a tomographic image of an object to be inspected can be reconstructed to a final image, by using a 2D projection image of the object that is acquired through an X-ray. Additionally, a tomographic image of an object to be inspected that includes a material discrimination image can be reconstructed to a final image, by using a 2D projection of the object that is acquired through a multi-energy X-ray.

Furthermore, material discrimination of an object to be inspected can be performed, by using a 2D projection image of the object that is acquired through a multi-energy X-ray.

According to an embodiment, a tomographic image of a predetermined object to be inspected may be reconstructed, or material discrimination for the object may be performed, by computing an initial value with respect to the tomographic image, by initializing an auxiliary variable, by computing a weighted value and an error value based on a measured value, by performing a transform enabling a multi-resolution analysis on the measured value, by updating the auxiliary variable using a transform coefficient of the measured value, and by updating the measured value using the updated auxiliary variable, the weighted value, and the error value. Aspects the above operations may be repeated accordingly to reconstruct the tomographic image and perform the material discrimination.

Figure 1:
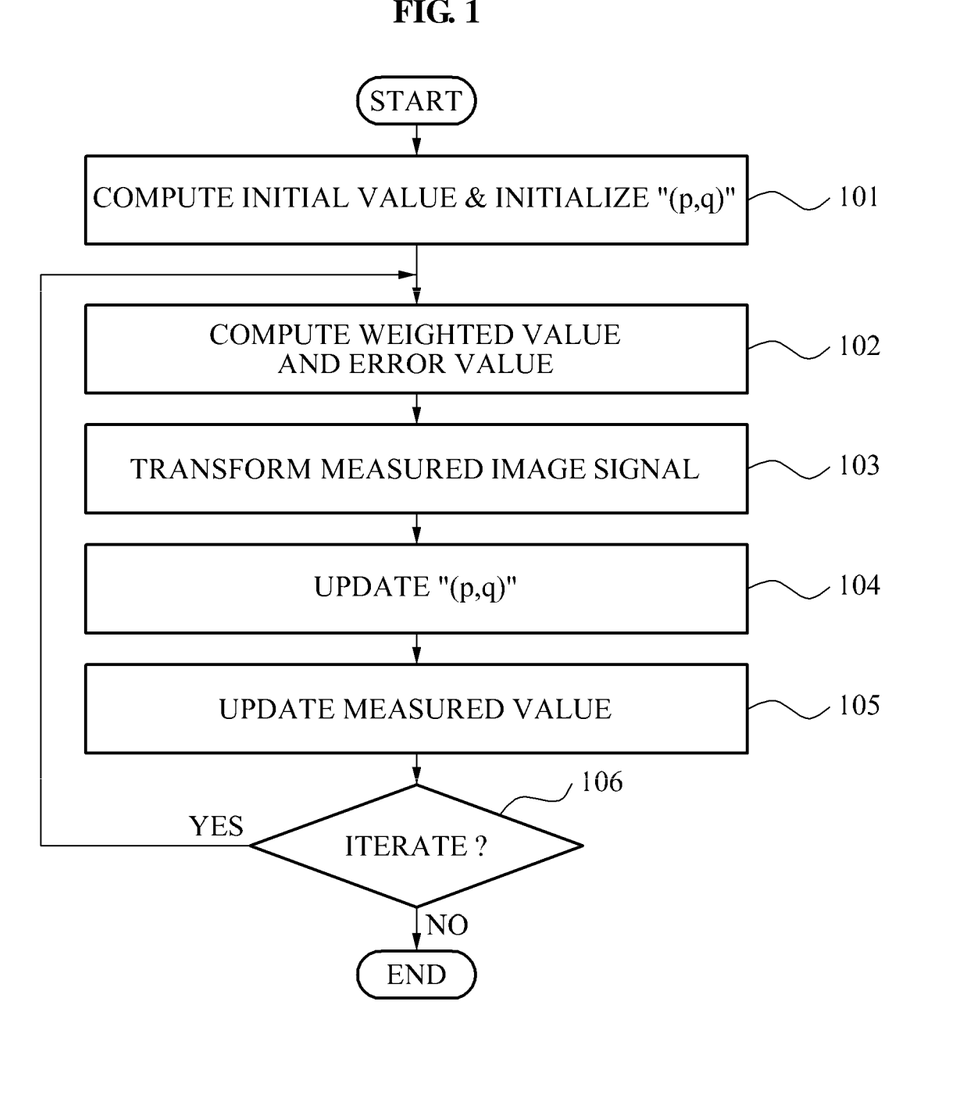
FIG. 1 is a flowchart illustrating an image reconstruction processing method according to an example embodiment.

FIG. 1 illustrates an image reconstruction processing method according to an example embodiment.

Referring to FIG. 1, in operation 101, an initial value with respect to a tomographic image of a predetermined object to be inspected may be computed, and an auxiliary variable "(p,q)" may be initialized.

In operation 102, a weighted value and an error value may be computed based on a measured value.

For example, a weighted value "$(W^T W)^{(-1)}$" and an error value "$b_0$" may be computed based on a secondary Taylor series approximation of a Kullback-Leibler (KL) divergence function corresponding to a Poisson log-likelihood function.

As another example, a weighted value "$(W^T W)^{(-1)}$" and an error value "$b_0$" may be computed using one or more of an ML-EM algorithm based on a monochromatic radiation model, an ML-convex algorithm, and a SART algorithm.

In operation 103, a measured image signal may be transformed. Here, a transform scheme enabling a multi-resolution analysis may be applied.

In operation 104, the initialized auxiliary variable "(p,q)" may be updated using a transform coefficient used to transform the measured image signal.

In operation 105, the measured value may be updated using the updated auxiliary variable "(p,q)", the computed weighted value, and the computed error value.

In the example image reconstruction processing method, to transform the measured image signal so that the multi-resolution analysis is enabled, one or more of a wavelet transform, a contourlet transform, a curvelet transform, a shearlet transform, a bandelet transform, and a ridgelet transform may be used.

In operation 106, whether to repeat operations 102 to 105 may be determined. When operations 102 to 105 are determined to be repeated, the image reconstruction processing method may return to operation 102. When operations 102 to 105 are not repeated, the image reconstruction processing method may be completed after the updating of the measured value in operation 105.

Figure 2:
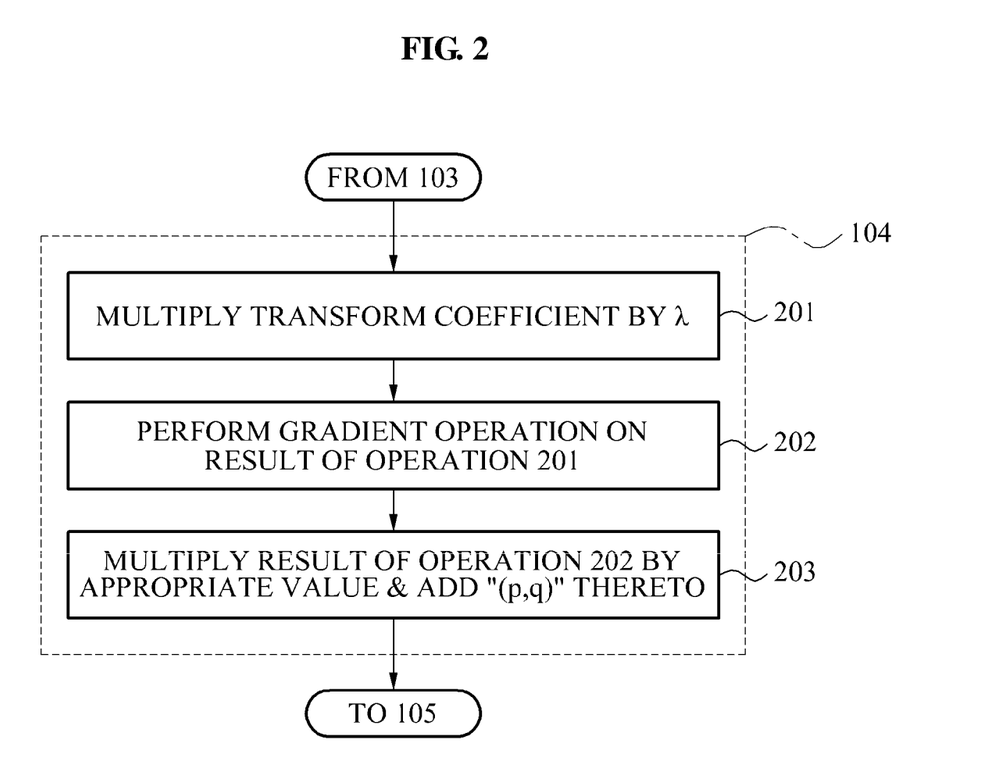
FIG. 2 is a flowchart illustrating an operation of updating an auxiliary variable in the image reconstruction processing method of FIG. 1.

FIG. 2 further illustrates the operation 104 of the image reconstruction processing method of FIG. 1.

Referring to FIG. 2, in operation 201, the transform coefficient of the measured value may be multiplied by a weighted value "λ" for each portion. In operation 202, a gradient operation may be performed on the transform coefficient multiplied by the weighted value "λ".

In operation 203, the transform coefficient where the gradient operation is performed may be multiplied by an appropriate value, for example, a weighted value "c", and a current auxiliary variable "(p,q)" may be added thereto. Thus, the auxiliary variable "(p,q)" may be updated.

Figure 3:
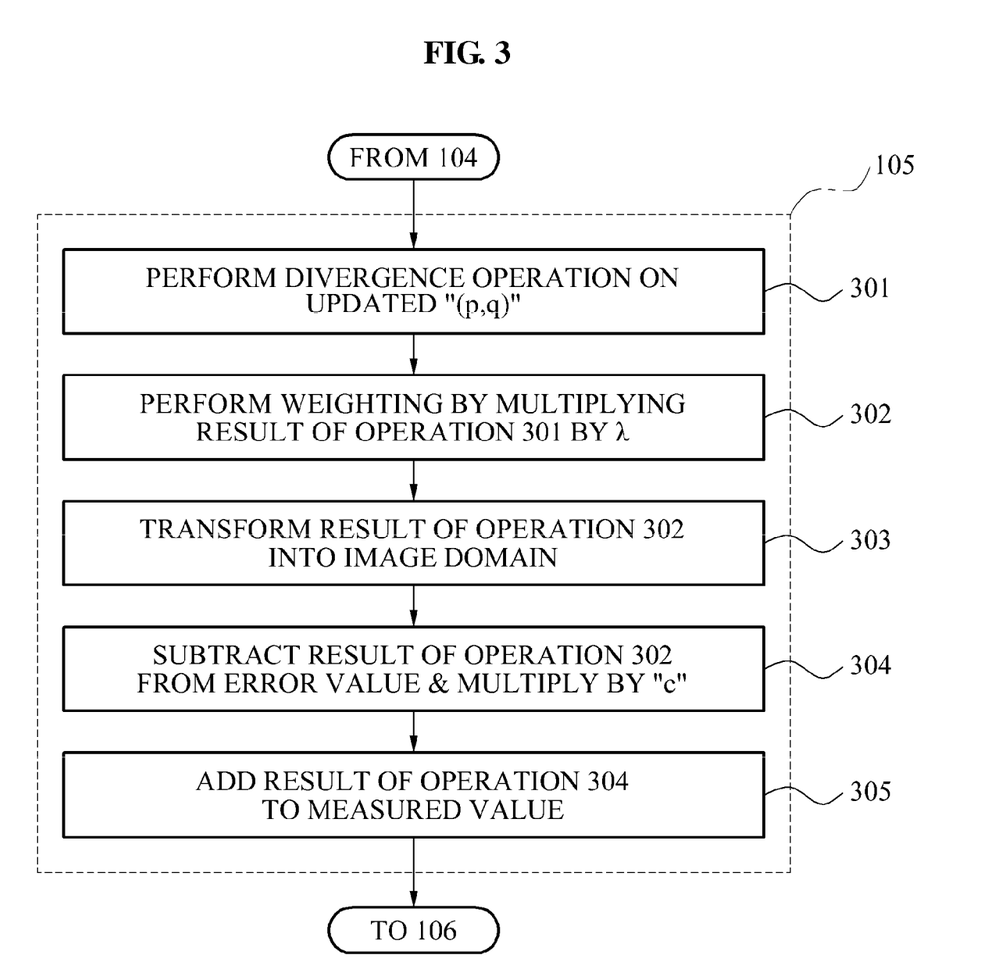
FIG. 3 is a flowchart illustrating an operation of updating a measured value in the image reconstruction processing method of FIG. 1.

FIG. 3 further illustrates the operation 105 of the image reconstruction processing method of FIG. 1.

Referring to FIG. 3, in operation 301, a divergence operation may be performed on the updated auxiliary variable "(p,q)".

In operation 302, weighting may be performed by multiplying, by the weighted value "λ", the auxiliary variable "(p,q)" where the divergence operation is performed, for each portion. In operation 303, the auxiliary variable "(p,q)" multiplied by the weighted value "λ" may be transformed into an image domain, and transformed into an image signal.

In operation 304, a result of the operation 302 may be subtracted from the error value, and a value obtained by the subtracting may be multiplied by the weighted value "c" again. In operation 305, a result of the operation 304 may be added to the measured value. Accordingly, the measured value may be updated.

Figure 4:
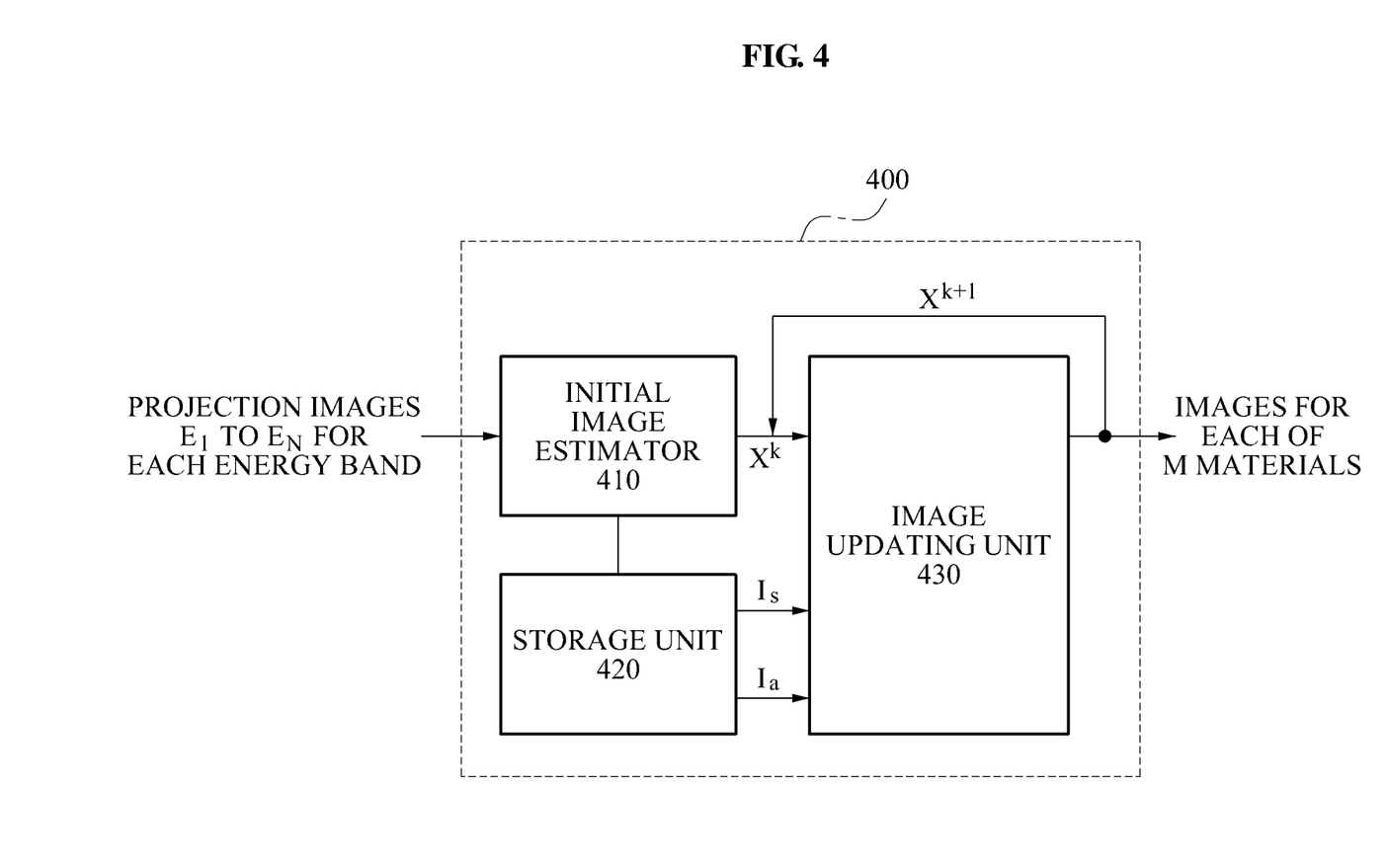
FIG. 4 is a block diagram illustrating a material discrimination image generator of an image reconstruction processing apparatus, according to an example embodiment.

FIG. 4 illustrates a material discrimination image generator 400 of an image reconstruction processing apparatus according to an example embodiment.

The material discrimination image generator 400 of FIG. 4 includes an initial image estimator 410, a storage unit 420, and an image updating unit 430.

For example, the initial image estimator 410 receives projection images $E_1$ to $E_N$ for each energy band generated by passing a multi-energy X-ray spectrum through an object that is to be inspected and that is formed of at least one material, and generate initial images for each of M materials forming the object. The initial image estimator 410 may estimate the initial images using energy distribution information for each of the at least one material of the object.

The storage unit 420 records, for example, in a table form, attenuation information $I_A$ corresponding to the at least one material, and spectrum information $I_S$ for the multi-energy X-ray.

The image updating unit 430 updates the initial images to which the correction value is applied, for a predetermined number of times, by providing the initial images as feedback.

The attenuation information $I_A$ and the spectrum information $I_S$ recorded in the storage unit 420 may be input to the image updating unit 430, and may be used to update the initial images output from the initial image estimator 410.

The image updating unit 430 may update the initial images to a material discrimination image by further using a hyperparameter associated with the material. Here, the hyperparameter may be interpreted as a component ratio of the material.

The spectrum information $I_S$ stored in the storage unit 420 may be recorded in an external storage device in another implementation. For example, the storage unit 420 may be merely logically referred to, that is, does not refer to a physical location where corresponding information is actually recorded.

The image updating unit 430 may update the initial images to a material discrimination image, using the initial images estimated by the initial image estimator 410 and the spectrum information $I_S$ and attenuation information $I_A$ recorded in the storage unit 420.

An image updating procedure performed by the image updating unit 430 may employ a scheme of computing a correction value for minimizing a predetermined cost function, applying the correction value to the initial images, and updating the initial images to the material discrimination image. According to an embodiment, the image updating unit 430 may perform pixel-by-pixel updating based on pixels of an image. According to another embodiment, the image updating unit 430 may perform block-by-block updating, or according to still another embodiment, perform image-by-image updating. Accordingly, while the operation of the image updating unit 430 is described, for example, based on the pixel-by-pixel updating, it is understood that implementations are not limited thereto.

Figure 5:
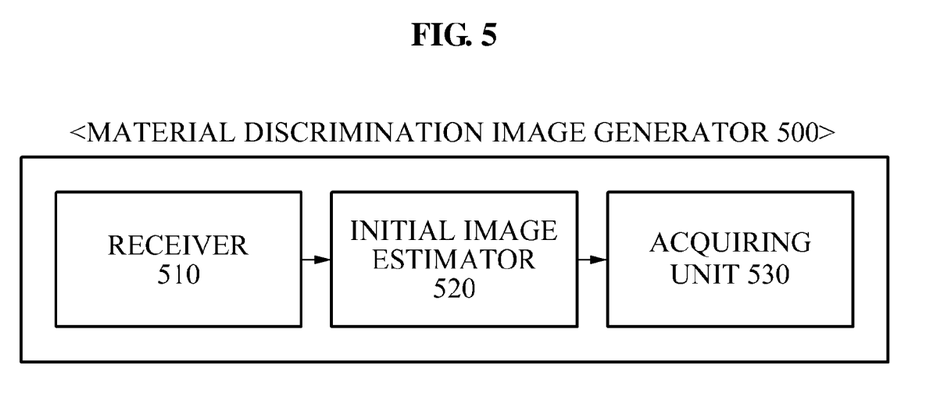
FIG. 5 is a block diagram illustrating a material discrimination image generator of an image reconstruction processing apparatus, according to another example embodiment.

FIG. 5 illustrates a material discrimination image generator 500 of an image reconstruction processing apparatus according to another example embodiment.

The material discrimination image generator 500 of FIG. 5 includes a receiver 510, an initial image estimator 520, and an acquiring unit 530.

For example, the receiver 510 receives projection images for each energy band. The initial image estimator 520 estimates initial images for each material based on the projection images.

The acquiring unit 530 acquires a material discrimination image for each material by applying an image updating algorithm to the initial images.

Figure 6:
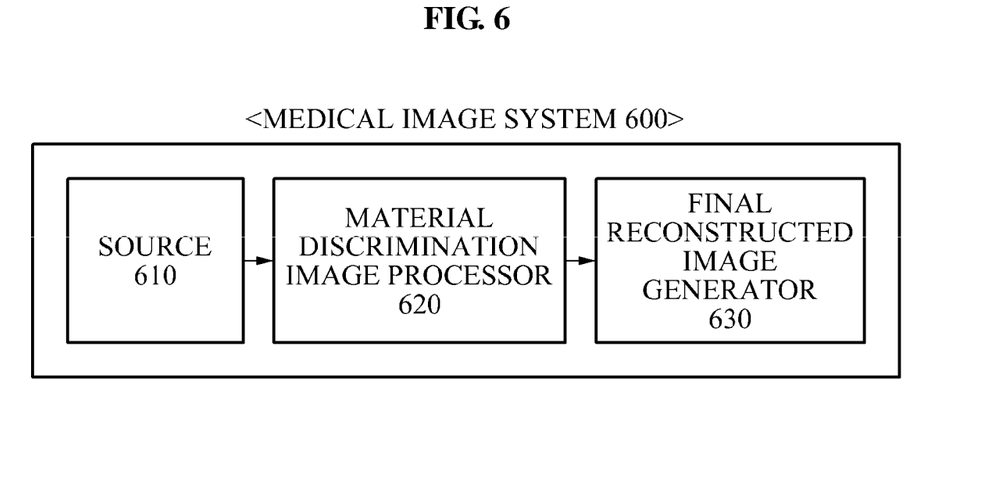
FIG. 6 is a block diagram illustrating a medical image system according to an example embodiment.

FIG. 6 illustrates a medical image system 600 according to an example embodiment.

The medical image system 600 includes a source 610, a material discrimination image processor 620, and a final reconstructed image generator 630.

For example, the source 619 irradiates a multi-energy X-ray spectrum to an object to be inspected. The material discrimination image processor 620 acquires a material discrimination image for each of materials forming the object. As an example, the material discrimination image processor 620 may receive a projection image of each energy band generated by passing the multi-energy X-ray spectrum through an object that is to be inspected and that is formed of at least one material, and may acquire a material discrimination image for each of the at least one material.

According to an aspect, the material discrimination image processor 620 may include a receiver to receive projection images for each energy band, an initial image estimator to estimate initial images for each of the materials, and an acquiring unit to acquire a material discrimination image for each material by applying an image updating algorithm to the initial images. The initial image estimator may estimate the initial images based on energy distribution information for each material.

In the example of FIG. 6, the final reconstructed image generator 630 generates a final reconstructed image by applying a repeating reconstruction algorithm to a tomographic image including the acquired material discrimination image.

The processes, functions, methods and/or software described herein may be recorded, stored, or fixed in one or more non-transitory computer-readable media including program instructions to be implemented by a computer to cause a processor to execute or perform the program instructions. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more non-transitory computer-readable media, in order to perform the operations of the above-described example embodiments, or vice versa. In addition, a computer-readable medium may be distributed among computer systems connected through a network and computer-readable codes or program instructions may be stored and executed in a decentralized manner.

According to certain example(s) described above, according to an aspect, a tomographic image may be reconstructed while satisfying a simple algorithm with high accuracy.

According to another aspect, a reconstruction performance may be improved even in a low dose environment, by using information of neighboring pixels.

According to another aspect, materials may be discriminated more efficiently even in a 2D multi-energy X-ray system.

According to another aspect, ML may be estimated accurately without an approximation of monochromatic radiation in a 3D tomosynthesis.

According to another aspect, 3D reconstruction may be performed more efficiently without a beam hardening artifact in a 3D tomosynthesis.

According to another aspect, 3D material discrimination may be performed more efficiently in a tomography using a 3D multi-energy.

According to another aspect, when a tissue of a living body such as a human body is to be inspected, data such as a Bone Mineral Density (BMD), a Total Body Fat (TBF), a Total Body Water (TBW), and the like can be measured.

According to another aspect, an X-ray image with high quality and high contrast may be obtained using a medical image apparatus according to teachings herein.

According to another aspect, a material discrimination image applicable to a conventional dual energy CT may be obtained.

According to another aspect, aliasing and artifacts may be prevented from occurring in a tomographic image in a limited angle that is obtained from an object to be inspected.

According to another aspect, an amount of information used in synthesis of a tomographic image may be reduced, and accordingly, an amount of radiation exposure for an object to be inspected may be reduced.

According to another aspect, a number of viewpoint images used in synthesis of a tomographic image may be reduced, and accordingly, a capturing time may be reduced.

According to another aspect, blurring in a depth direction using a repeating reconstruction algorithm may be reduced.

According to another aspect, an artifact with respect to a sparse viewpoint may be dealt with more robustly.

According to another aspect, a complex L1 minimization problem and a TV regularization problem may be processed more quickly, using a modified repeating reduction algorithm, and acceleration may be possible using a General Processing Unit (GPU).

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image reconstruction processing method, comprising:
    acquiring an initial value with respect to a tomographic image of an object to be inspected;
    initializing an auxiliary variable;
    acquiring one or both of a weighted value and an error value, based on a measured value;
    transforming a measured image signal;
    updating the initialized auxiliary variable using a transform coefficient used to transform the measured image signal; and
    updating the measured value using the updated auxiliary variable, and one or both of the acquired weighted value and the error value.

2. The image reconstruction processing method of claim 1, wherein the acquiring of one or both of the weighted value and the error value comprises computing one or both of the weighted value and the error value based on a secondary Taylor series approximation of a Kullback-Leibler (KL) divergence function corresponding to a Poisson log-likelihood function.

3. The image reconstruction processing method of claim 1, wherein the acquiring of one or both of the weighted value and the error value comprises computing one or both of the weighted value and the error value, using one or more of a maximum likelihood-expectation maximization (ML-EM) algorithm based on a monochromatic radiation model, an ML-convex algorithm, and a simultaneous algebraic reconstruction technique (SART) algorithm.

4. The image reconstruction processing method of claim 1, wherein the transforming of the measured image signal comprises transforming the measured image signal to enable a multi-resolution analysis.

5. The image reconstruction processing method of claim 4, wherein the transforming of the measured image signal to enable the multi-resolution analysis comprises transforming the measured image signal using one or more of a wavelet transform, a contourlet transform, a curvelet transform, a shearlet transform, a bandelet transform, and a ridgelet transform.

6. The image reconstruction processing method of claim 1, wherein the updating of the auxiliary variable comprises:
    multiplying a transform coefficient of the measured value by a first weighted value for each portion;
    performing a gradient operation on the transform coefficient multiplied by the first weighted value; and
    multiplying the transform coefficient where the gradient operation is performed, by a second weighted value, and adding the auxiliary variable thereto.

7. The image reconstruction processing method of claim 1, wherein the updating of the measured value comprises:
    performing a divergence operation on the updated auxiliary variable;
    multiplying the auxiliary variable where the divergence operation is performed by a first weighted value for each portion;
    transforming the auxiliary variable multiplied by the first weighted value into an image signal; and
    multiplying a value obtained by subtracting a value resulting from the transforming of the auxiliary variable from the acquired error value, by a second weighted value, and adding the measured value thereto.

8. The image reconstruction processing method of claim 1, further comprising repeating the acquiring of one or more of the weighted value and the error value, the transforming of the measured image signal, the updating of the initialized auxiliary variable, and the of updating the measured value.

* * * * *